US012357874B2

(12) United States Patent
Alessi et al.

(10) Patent No.: US 12,357,874 B2
(45) Date of Patent: Jul. 15, 2025

(54) WEARABLE SYSTEM AND METHOD FOR SENSING AND MONITORING A SWIMMING ACTIVITY OF A USER

(71) Applicant: STMicroelectronics S.r.l., Agrate Brianza (IT)

(72) Inventors: Enrico Rosario Alessi, Catania (IT); Fabio Passaniti, Syracuse (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 865 days.

(21) Appl. No.: 17/466,553

(22) Filed: Sep. 3, 2021

(65) Prior Publication Data
US 2022/0072373 A1  Mar. 10, 2022

(30) Foreign Application Priority Data
Sep. 9, 2020  (IT) ........................ 102020000021364

(51) Int. Cl.
*A63B 24/00* (2006.01)
*G06F 18/2115* (2023.01)

(52) U.S. Cl.
CPC ...... *A63B 24/0006* (2013.01); *G06F 18/2115* (2023.01); *A63B 24/0062* (2013.01);
(Continued)

(58) Field of Classification Search
None
See application file for complete search history.

(56) References Cited

U.S. PATENT DOCUMENTS

| 7,980,998 B2 | 7/2011 | Shemesh et al. |
| 8,988,240 B2 | 3/2015 | Burton et al. |

(Continued)

FOREIGN PATENT DOCUMENTS

| CN | 104736208 A | 6/2015 |
| CN | 106999106 A | 8/2017 |

(Continued)

OTHER PUBLICATIONS

Cheng, Jingyuan, et al., "Active Capacitive Sensing: Exploring a New Wearable Sensing Modality for Activity Recognition", Proceedings of the 8th International Conference on Pervasive Computing, Lecture Notes in Computer Science, vol. 6030, published Jan. 1, 2010, total 21 pages.

Delgado-Gonzalo, R., et al., "Real-time Monitoring of Swimming Performance", 2016 38th Annual International Conference of the IEEE Engineering in Medicine and Biology Society, Aug. 2016, total 4 pages.

(Continued)

*Primary Examiner* — Raul J Rios Russo
*Assistant Examiner* — Carl F. R. Tchatchouang
(74) *Attorney, Agent, or Firm* — Slater Matsil, LLP

(57) ABSTRACT

A system can be used for detecting execution of a swimming activity of a user. The system includes a processing unit, a buffer, and an electrostatic-charge-variation sensor configured to sense a variation of electrostatic charge of the user during execution of the swimming activity and to generate a corresponding charge-variation signal. The processing unit is configured to acquire the charge-variation signal, detect a first sub-portion of signal that identifies a basic movement of the swimming activity in the charge-variation signal, store the first sub-portion of signal in the buffer, compute an auto-correlation between the first sub-portion of signal stored in the buffer and a second sub-portion of signal of the charge-variation signal, and detect the presence of the basic movement in the second sub-portion of signal based on a result of the auto-correlation.

28 Claims, 11 Drawing Sheets

(52) U.S. Cl.
CPC ... *A63B 2220/803* (2013.01); *A63B 2220/836* (2013.01); *A63B 2244/20* (2013.01); *G06F 2218/00* (2023.01)

(56) References Cited

U.S. PATENT DOCUMENTS

| | | | |
|---|---|---|---|
| 9,329,273 | B1 | 5/2016 | Mazzagatti, Jr. |
| 9,387,361 | B2* | 7/2016 | Nomura .............. G09B 19/0038 |
| 10,356,189 | B2 | 7/2019 | Miettinen et al. |
| 10,478,703 | B2 | 11/2019 | Ping et al. |
| 10,845,955 | B2 | 11/2020 | William et al. |
| 10,874,901 | B2 | 12/2020 | Miettinen et al. |
| 10,953,307 | B2 | 3/2021 | Wilson et al. |
| 2004/0020856 | A1 | 2/2004 | Wong et al. |
| 2008/0018532 | A1 | 1/2008 | Mackintosh et al. |
| 2009/0027211 | A1* | 1/2009 | Cutler ...................... E04H 4/06 340/573.6 |
| 2009/0048044 | A1 | 2/2009 | Oleson et al. |
| 2009/0239710 | A1 | 9/2009 | Shemesh et al. |
| 2010/0009760 | A1 | 1/2010 | Shimamura et al. |
| 2011/0223998 | A1* | 9/2011 | Asano .................... G06F 3/017 463/36 |
| 2011/0288381 | A1 | 11/2011 | Bartholomew et al. |
| 2012/0015779 | A1 | 1/2012 | Powch et al. |
| 2012/0072165 | A1 | 3/2012 | Jallon |
| 2012/0231840 | A1 | 9/2012 | Calman et al. |
| 2012/0283856 | A1 | 11/2012 | Caritu et al. |
| 2013/0337974 | A1 | 12/2013 | Yanev et al. |
| 2014/0277628 | A1 | 9/2014 | Nieminen et al. |
| 2016/0154952 | A1 | 6/2016 | Venkatraman et al. |
| 2016/0196765 | A1* | 7/2016 | Stauch .................. G09B 19/00 434/236 |
| 2017/0281057 | A1 | 10/2017 | Blahnik et al. |
| 2017/0337349 | A1 | 11/2017 | Cronin |
| 2019/0251238 | A1 | 8/2019 | Venkatraman et al. |
| 2019/0339849 | A1 | 11/2019 | Williams et al. |
| 2020/0101365 | A1 | 4/2020 | Wilson et al. |
| 2021/0350900 | A1 | 11/2021 | Blahnik et al. |
| 2022/0080261 | A1 | 3/2022 | Li |

FOREIGN PATENT DOCUMENTS

| | | |
|---|---|---|
| CN | 107025370 A | 8/2017 |
| CN | 109829107 A | 5/2019 |
| CN | 111035394 A | 4/2020 |
| CN | 111603746 A | 9/2020 |
| EP | 1870139 A1 | 12/2007 |
| EP | 1992389 A1 | 11/2008 |
| EP | 2128724 A2 | 12/2009 |
| GB | 2465824 A | 6/2010 |
| KR | 101584459 B1 | 1/2016 |
| WO | 03061779 A1 | 7/2003 |
| WO | 2010083562 A1 | 7/2010 |
| WO | 2010090867 A2 | 8/2010 |
| WO | 2010113135 A1 | 10/2010 |
| WO | 2011150451 A1 | 12/2011 |
| WO | 2015087164 A1 | 6/2015 |

OTHER PUBLICATIONS

Mooney, Robert, et al. "Inertial Sensor Technology for Elite Swimming Performance Analysis: A Systematic Review", Sensors (Basel, Switzerland) 2016, vol. 16, published Dec. 25, 2015, total 55 pages.

* cited by examiner

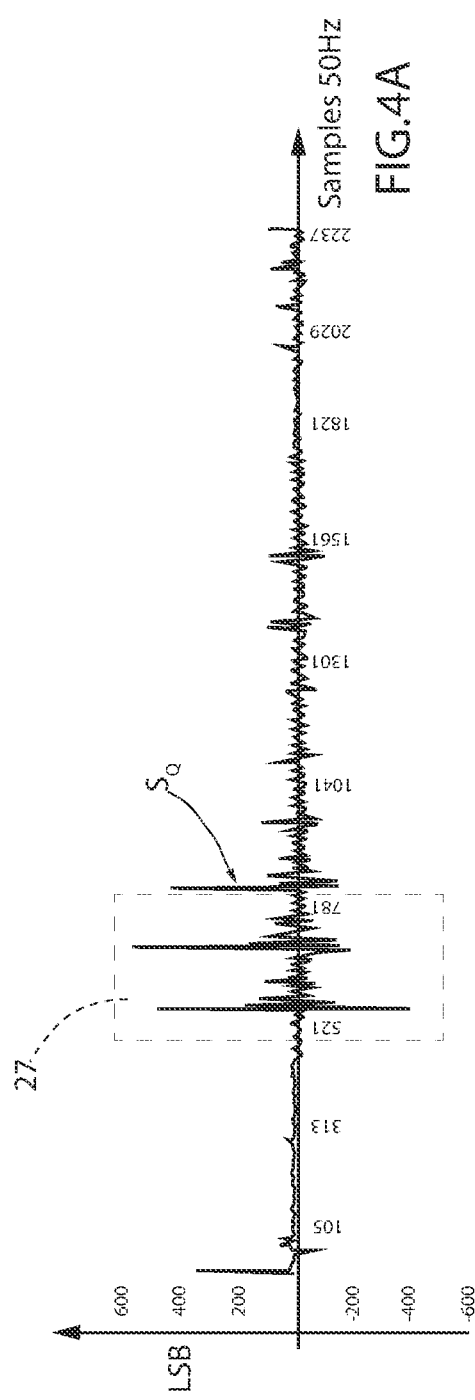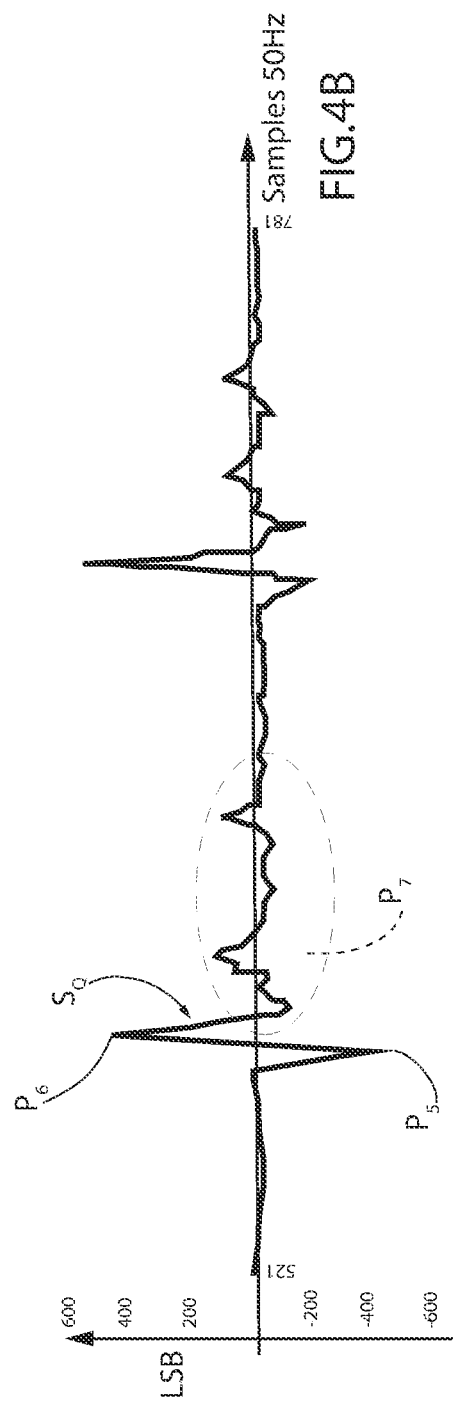

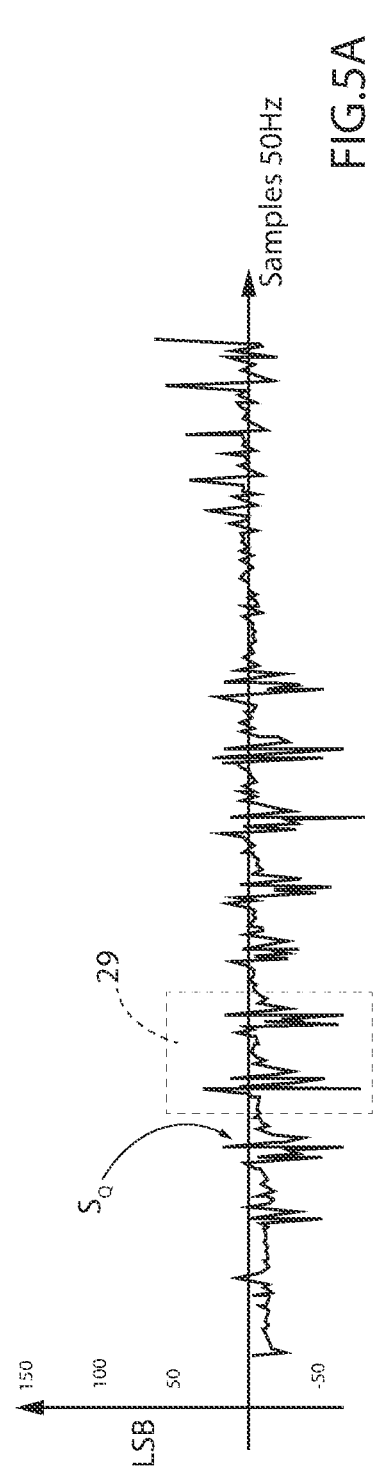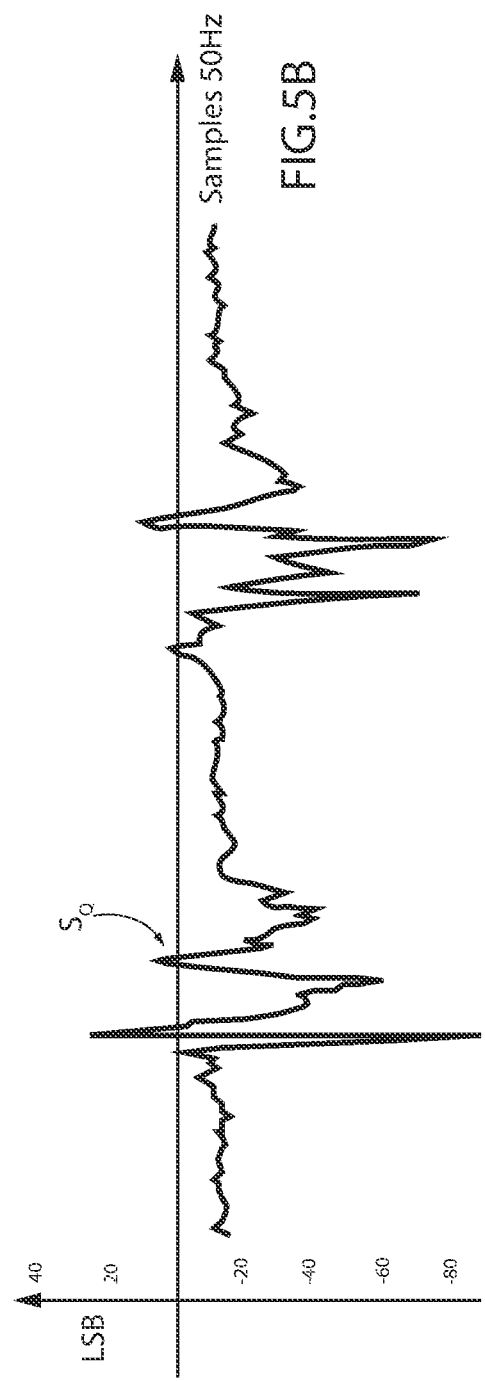

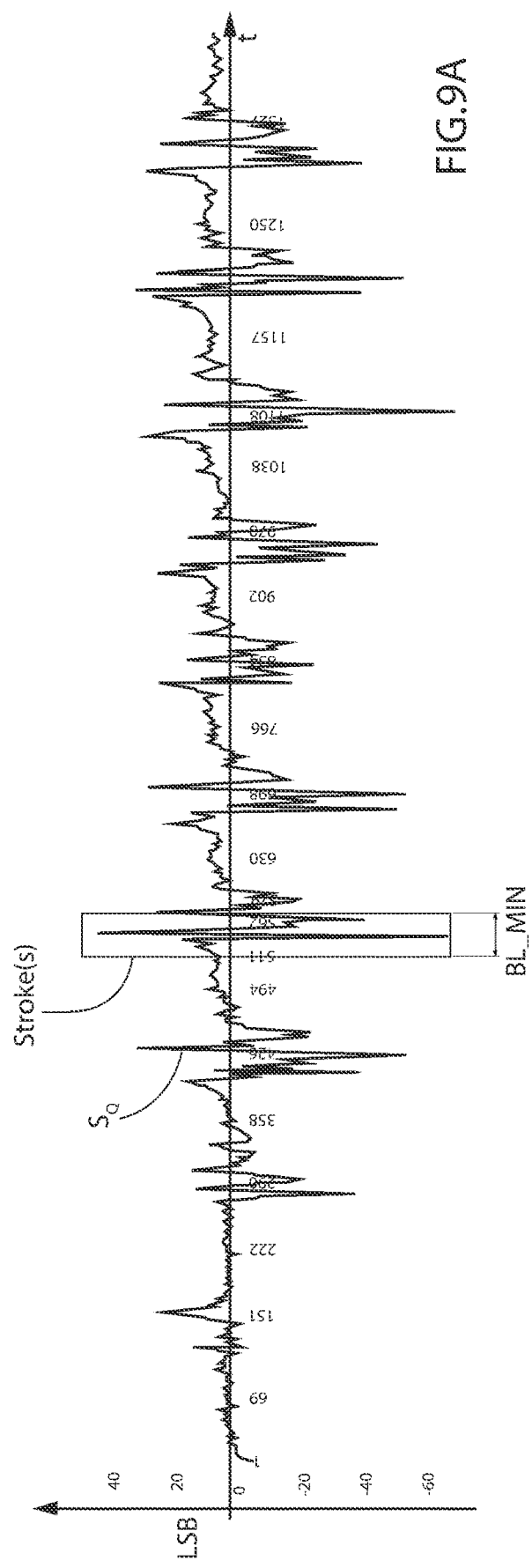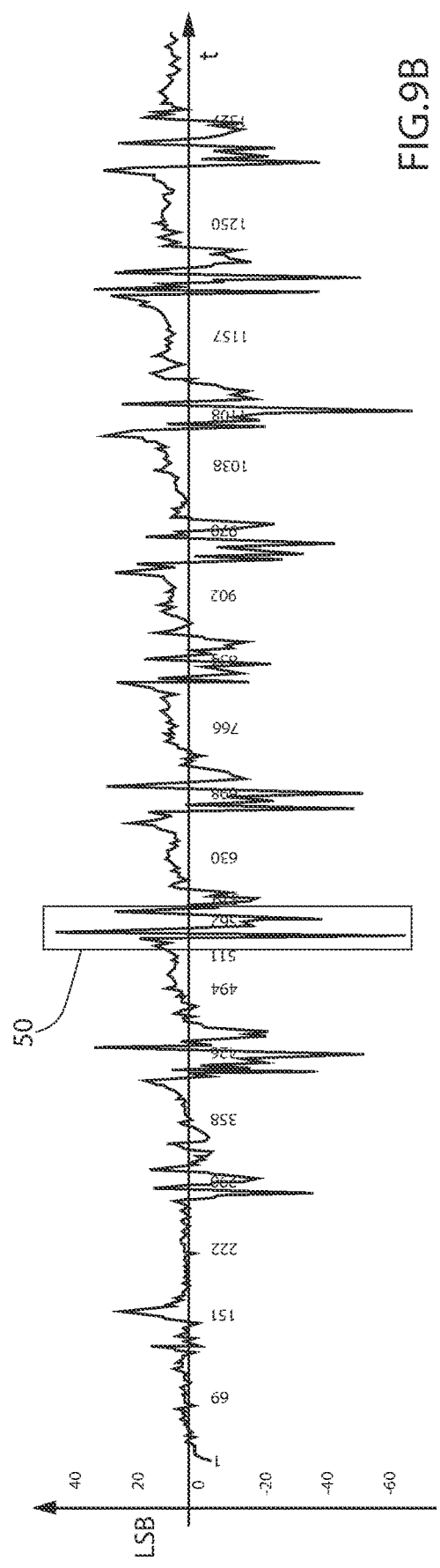

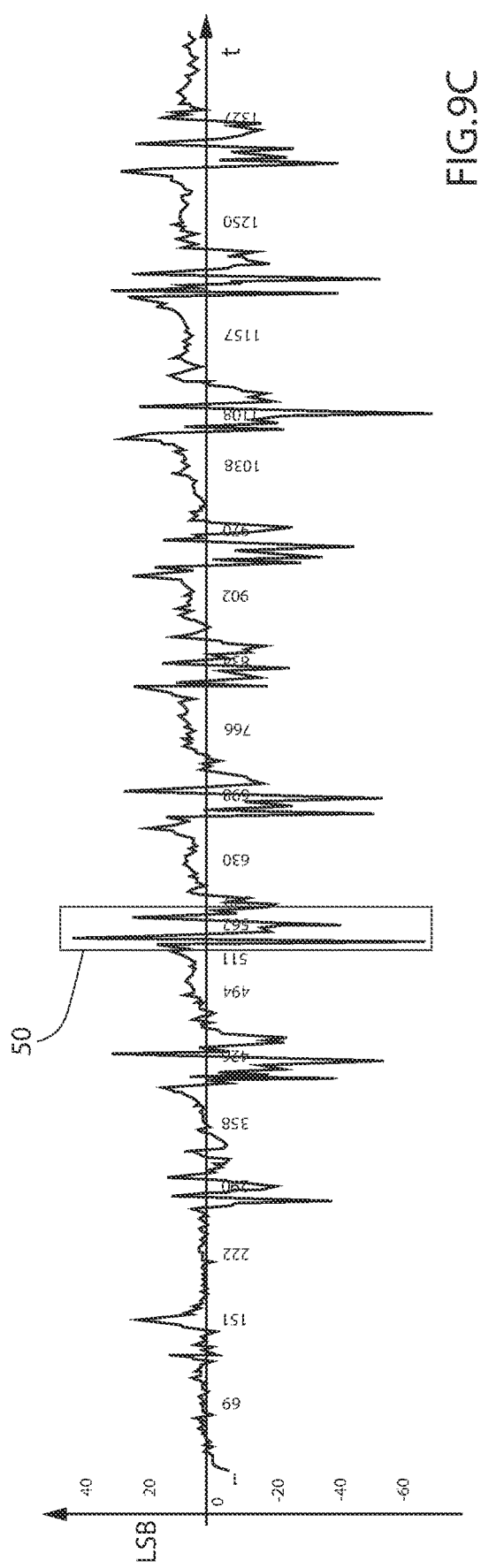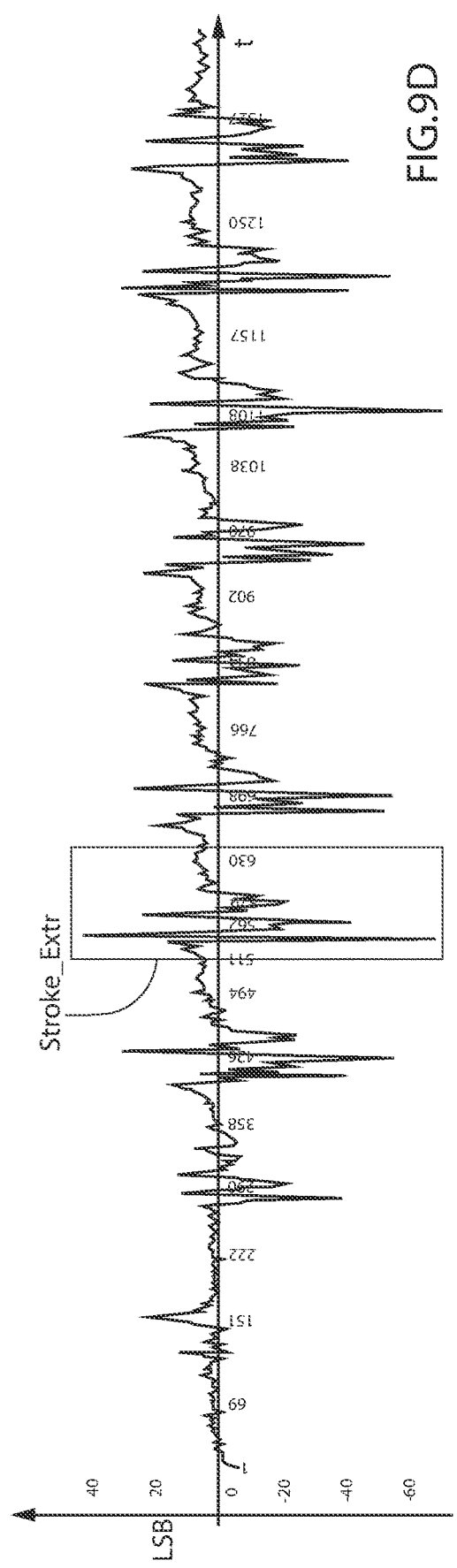

WEARABLE SYSTEM AND METHOD FOR SENSING AND MONITORING A SWIMMING ACTIVITY OF A USER

CROSS-REFERENCE TO RELATED APPLICATIONS

This application claims the benefit of Italian Patent Application No. 102020000021364, filed on Sep. 9, 2020, which application is hereby incorporated herein by reference.

TECHNICAL FIELD

The present invention relates generally to a wearable system and method for sensing and monitoring a swimming activity of a user.

BACKGROUND

Systems and methods are known for analysis of the swimming activity at a professional level, in order to monitor the performance and the swimming style of a swimmer. A method used envisages video acquisition and analysis. This method entails high costs due to the need to arrange a plurality of video cameras, synchronized with one another, and of a complex post-processing. For instance, images obtained by video cameras positioned above and under the water enable extraction of information for the entire swimming course, via appropriate image-processing operations. Some disadvantages of this method regard the delay with which a feedback is provided to the trainer and to the athlete and the applicability exclusively to a professional context (as a result of the costs and complexity of the system).

Today, low-cost movement sensors integrated in wearable devices enable use of low-level devices with the same purpose. Unfortunately, the noisy environment and the complex actions of swimming render difficult analysis of the data, which are typically obtained by means of accelerometers or other inertial sensors; this problem can only partially be overcome by using sophisticated algorithms for processing the signals acquired. Frequently, it is necessary to wear a multitude of sensors to compensate for or reduce the errors and improve the result of the performance metrics. In addition, the algorithms used are strictly connected with the positioning of the sensors.

A document by Robert Mooney, dated 2015, entitled "Inertial Sensor Technology for Elite Swimming Performance Analysis: A Systematic Review," summarizes various possibilities of use of movement sensors for targeting the analysis of the swimming activity. As may be learnt from this article, the analysis typical of swimming is oriented to extracting the parameters that enable measurement of the performance of the athlete and provide a feedback for continuous improvement. Some of the parameters are of interest both for trainers and for athletes, amongst which: detecting the mere swimming activity; classification of the swimming style; counting of the strokes; duration of the lap time; pace/speed per lap; etc.

A document by R. Delgado-Gonzalo, et al., "Real-time monitoring of swimming performance," 2016, 38th Annual International Conference of the IEEE Engineering in Medicine and Biology Society (EMBC), Orlando, FL, 2016, pp. 4743-4746, presents a method of measurement of some of the parameters mentioned above by means of movement sensors obtained using MEMS technology.

SUMMARY

Embodiments of the present invention can overcome some deficiencies of the prior art by providing a system for sensing swimming parameters (e.g., count of strokes and analysis of style) that is inexpensive but reliable, and that entails a reduced computational burden.

As one example, a system can be used for detecting execution of a swimming activity of a user. The system includes a processing unit and an electrostatic-charge-variation sensor coupled to the processing unit. The sensor is configured to sense a variation of electrostatic charge of the user during execution of the swimming activity and generate a corresponding charge-variation signal. The processing unit is configured to acquire the charge-variation signal, detect, in the charge-variation signal, a first sub-portion of signal identifying a basic movement of the swimming activity, store, in a first buffer, the first sub-portion of signal, compute an auto-correlation between the first sub-portion of signal stored in the first buffer and a second sub-portion of signal of the charge-variation signal, which is temporally subsequent to the first sub-portion of signal and, on the basis of a result of the auto-correlation, detect the presence of the basic movement in the second sub-portion of signal.

BRIEF DESCRIPTION OF THE DRAWINGS

For a better understanding of the invention, embodiments thereof are now described, purely by way of non-limiting example and with reference to the attached drawings, wherein:

FIGS. 4A and 4B illustrate respective signals generated at output from the electrical-charge-variation sensor of FIG. 2 in the case of the swimming style known as "backstroke";

FIGS. 5A and 5B illustrate respective signals generated at output from the electrical-charge-variation sensor of FIG. 2 in the case of the swimming style known as "breaststroke;"

FIGS. 9A-9E illustrate graphically steps of the method of FIG. 8; and

DETAILED DESCRIPTION OF ILLUSTRATIVE EMBODIMENTS

Figure 1:
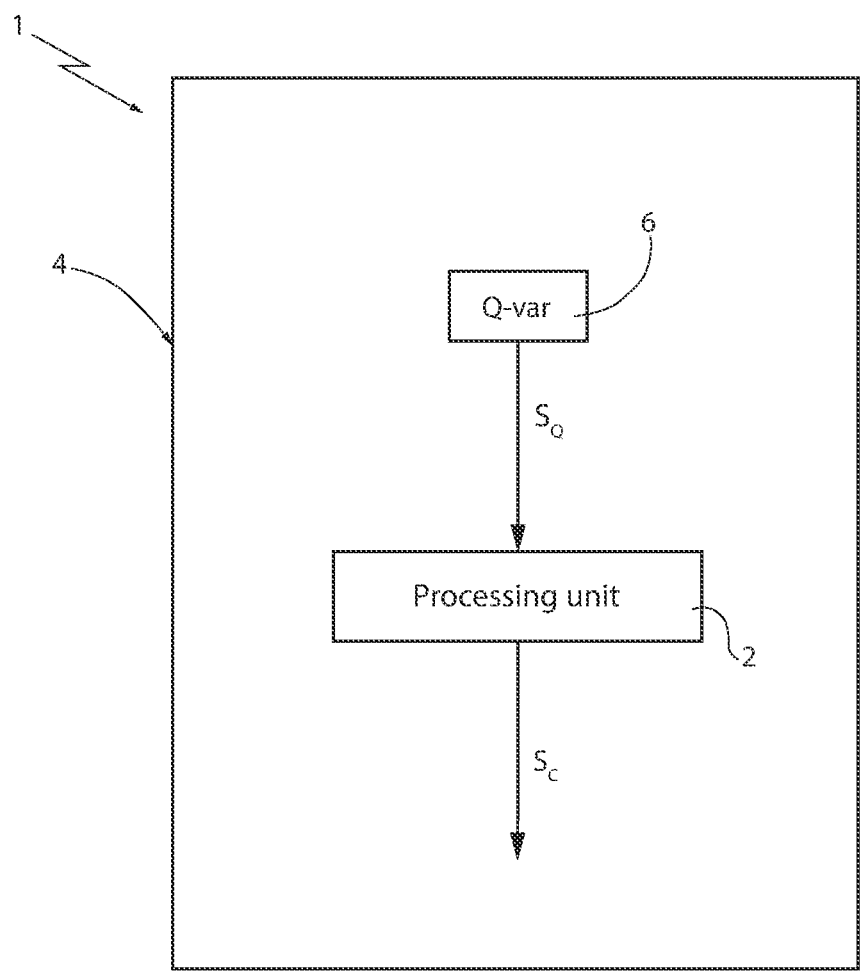
FIG. 1 is a schematic illustration of a system for sensing a swimming activity including an electrical or electrostatic charge-variation sensor, according to an embodiment of the present invention.

FIG. 1 is a schematic illustration of a movement-sensing system 1 according to one aspect of the present invention. The movement-sensing system 1 comprises a processing unit 2 of an electronic device or system 4, and an electrostatic-charge-variation sensor 6 coupled to the processing unit 2. In one embodiment, the electrostatic-charge-variation sensor 6 is integrated in the device 4. The processing unit 2 receives a charge-variation signal $S_Q$ from the electrostatic-charge-variation sensor 6 and generates a sensing signal $S_O$ as a function of the charge-variation signal $S_Q$.

The processing unit 2 implements, in use, a method for recognizing a gesture made by a user of the device 4. The recognition of the gesture causes generation of the sensing signal Sc.

By way of non-limiting example, the device 4 is a portable electronic device wearable by the user, for example on his/her wrist, such as a smartwatch.

The processing unit 2 is, in one embodiment, a microcontroller integrated in the device 4.

The movement-sensing system 1 has at least one sensitive element, or electrode (identified by the reference number 5 in FIG. 2), to which a part of the user's body (e.g., the wrist) can be facing, to transfer an electrostatic-charge signal. The electrode 5 may be integrated in the case of the device 4, or connected to the device 4 in some other way, for example by means of a wired connection or an external wireless connection. For use in a wet environment, more specifically in water, the electrode 5 is inserted inside a waterproof case so as not to come into direct contact with the water during use. The case is of a material such as not to shield the electrostatic signal, which is generated by the user's body during use and has to be acquired by the electrode 5. For instance, the case is of dielectric or insulating material, for example plastic material.

Other embodiments are possible, as will be evident to the person skilled in the art, so that the electrode 5 will be in electrostatic contact with a region of the user's body during use.

The sensitive element (electrode) 5 that collects the external charge may have a metal surface or be an electrode entirely of metal material coated with dielectric material, or again have a metal surface set underneath the case of the device that integrates it. In any case, during use, the sensitive element 5 is electrostatically coupled to the user, in particular to the user's arm or wrist, for sensing a variation of electrical or electrostatic charge.

The movement-sensing device 1 is affected by the variation of electrostatic charge due to movements of the user. The signal deriving from specific movements (in particular, due to approach of the arm to, and to distancing of the arm from, the rest of the user's body during the various swimming styles, as the arm enters the water, and as the arm exits the water) can be isolated and identified with respect to other movements not of interest and with respect to the background noise present in the case of inactivity of the user.

Figure 2:
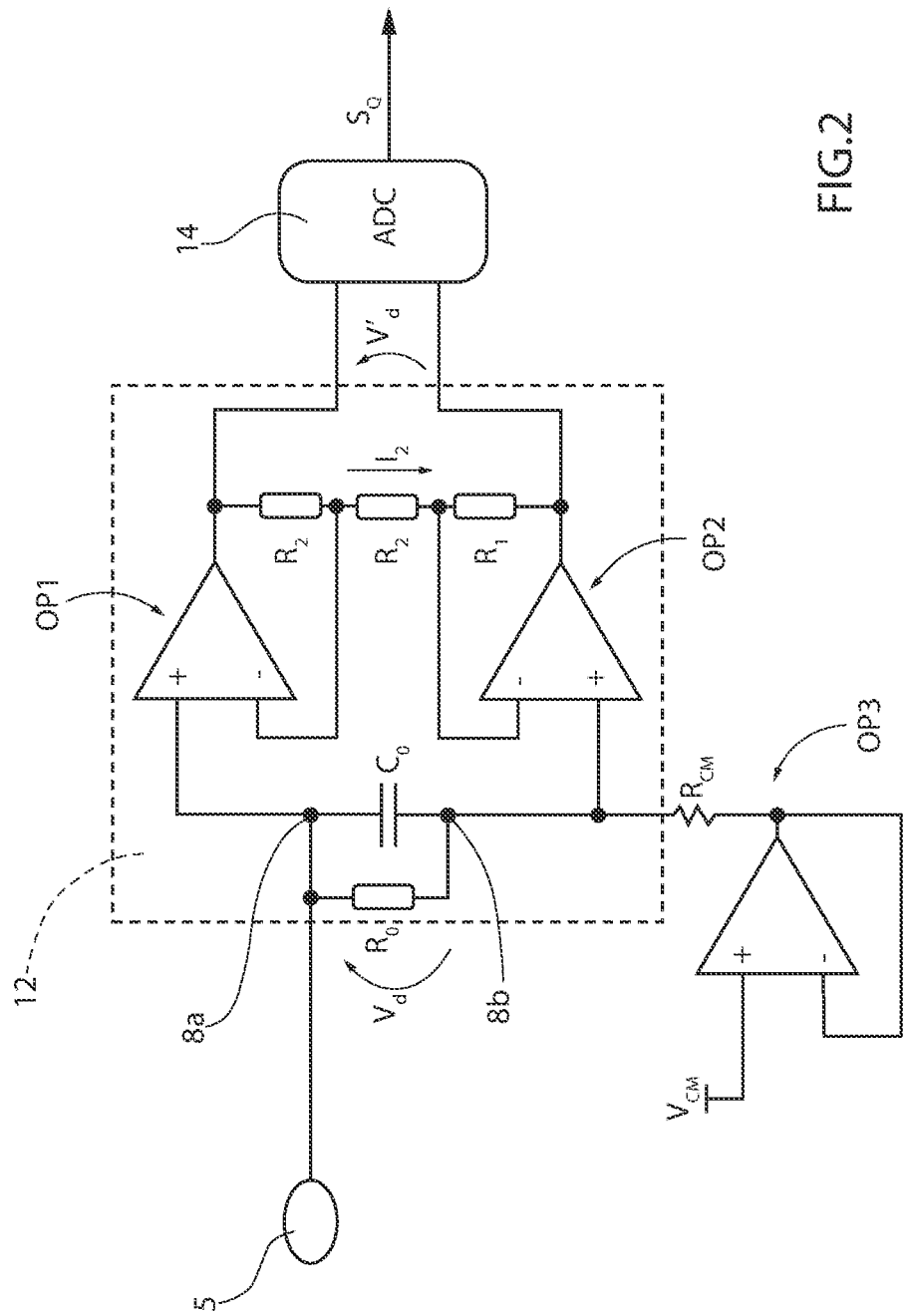
FIG. 2 illustrates an embodiment of an electrical or electrostatic charge-variation sensor wearable by a user during the swimming activity.

FIG. 2 moreover illustrates an embodiment provided by way of non-limiting example of a circuitry for acquiring the electrostatic-charge signal from the electrode 5 and, together with the latter, implementing an electrostatic-charge-variation sensor 6. The electrostatic-charge-variation sensor 6 comprises an input 8a electrically coupled (connected) to the electrode 5; the electrostatic-charge-variation sensor 6 further comprises an input 8b, electrically coupled to the input 8a by means of a resistor Ro and a capacitor Co in parallel to one another. The pair Ro, Co, connected to the electrode 5 and set between the two non-inverting inputs of the two operational amplifiers OP1 and OP2, has the function of accumulating the charges collected by the electrode 5 and of managing the band of the input signal (for filtering signals and noise at an undesired frequency).

The values of the capacitance of the capacitor Co and of the resistance of the resistor Ro may be chosen as a function of the type of filter that is to be formed, for example a lowpass filter, with a cutoff frequency of some tens of hertz, for example 20 Hz. For instance, the capacitance of the capacitor Co is chosen in the range from 20 pF to 20 nF. For instance, the resistance of the resistor Ro is chosen in the range from 10 MΩ to 100 MΩ. The values of capacitance of the capacitor Co and of resistance of the resistor Ro may likewise be chosen as a function of the impedance of the stage to which they are connected, of the useful frequency of the signal Vd, and of that of the interferences to be filtered (e.g., mains-supply frequency, high-frequency electrical noises of the power-supply circuits, etc.).

The voltage (or difference of electrical potential) Vd that is set up, in use, between the inputs 8a and 8b represents the differential input of an instrumentation amplifier 12.

The instrumentation amplifier 12 includes two operational amplifiers OP1 and OP2. A biasing stage (buffer) OP3 is used for biasing the instrumentation amplifier 12 at a common-mode voltage $V_{CM}$.

The inverting terminals of the operational amplifiers OP1 and OP2 are connected together by means of a resistor $R_2$. Since the two inputs of each operational amplifier OP1, OP2 must be at the same potential, the input voltage Vd is applied also across the resistor $R_2$ and causes, through the resistor $R_2$, a current equal to $I_2=Vd/R_2$. This current $I_2$ does not come from the input terminals of the operational amplifiers OP1, OP2 and therefore traverses the two resistors $R_1$ connected between the outputs of the operational amplifiers OP1, OP2, in series with respect to the resistor $R_2$; therefore, the current $I_2$, by traversing the series of the three resistors $R_1$-$R_2$-$R_1$, produces an output voltage Vd' given by $Vd'=I_2(2R_1+R_2)=Vd \cdot (1+2R_1/R_2)$. Consequently, the overall gain of the circuit of FIG. 3 is $Ad=(1+2R_1/R_2)$. The differential gain depends upon the value of the resistor $R_2$ and can therefore be modified by acting on the resistor $R_2$.

The differential output Vd', which is therefore proportional to the potential Vd between the inputs 8a, 8b, is supplied at input to an analog-to-digital converter 14, which provides at output the charge-variation signal $S_Q$ for the processing unit 2. The charge-variation signal $S_Q$ is, for example, a high-resolution digital stream (16 bits or 24 bits). The analog-to-digital converter 14 is optional in so far as the processing unit 2 may be configured to work directly on the analog signal, or may itself comprise an analog-to-digital converter designed to convert the signal Vd'.

In what follows, reference will be made to the signal $S_Q$ that is obtained by sampling the signal Vd', but what has been described applies equivalently to the signal Vd. In fact, the amplification stage (instrumentation amplifier of FIG. 2) is useful, but not necessary. If the charge-variation signal to be acquired (caused by the movement of the user) has a sufficient amplitude or if the electrical characteristics of the analog-to-digital converter so enable (e.g., high input impedance, high resolution, full scale suited to the signal to be converted, etc.), then the amplification stage may be omitted, and the inputs 8a and 8b are the inputs of the analog-to-digital converter.

According to an aspect of the present invention, sampling of the voltage Vd' is envisaged at a sampling rate of 50 Hz to generate the signal $S_Q$. The sampling rate is, for example, equal to 50 Hz, but may be different, for example chosen in the range from 10 Hz to 1 kHz. Sampling the voltage Vd' at 50 Hz means representing 2 seconds of the signal Vd' with N=100 samples $S_Q(1), \ldots, S_Q(N)$ of the signal $S_Q$.

Optionally, filtering of the signal $S_Q$ is likewise envisaged, to remove or attenuate possible spectral components not correlated to the movement to be detected. For instance, it is possible to carry out a lowpass filtering to attenuate the components of the signal $S_Q$ higher than 15 Hz, in order to abate as much as possible the noise induced by the electrical field of the mains supply (usually at 50 Hz or 60 Hz).

Figure 3A:
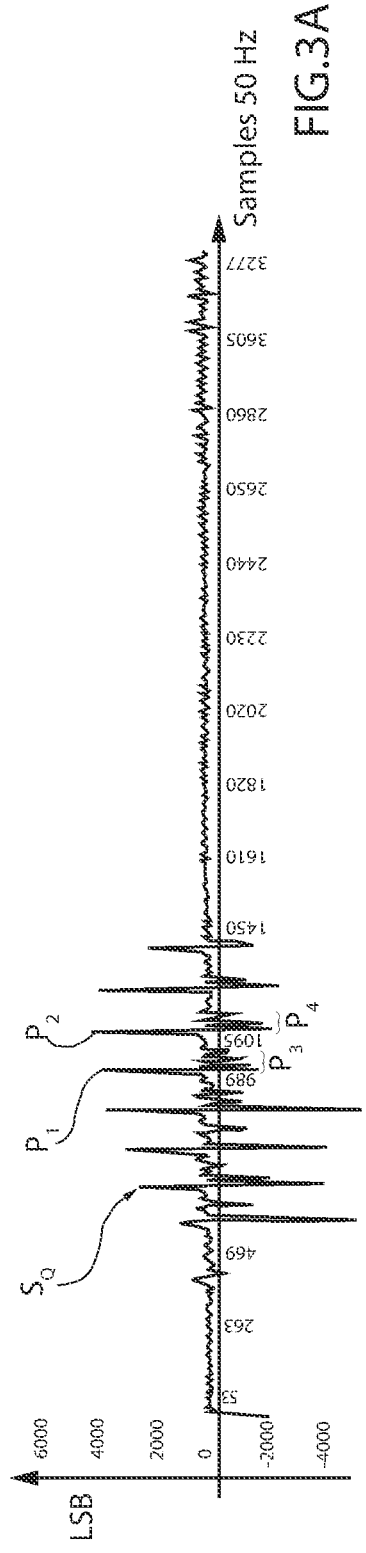
FIGS. 3A and 3B illustrate respective signals generated at output from the electrical-charge-variation sensor of FIG. 2 in the case of the swimming style known as "front crawl"
Figure 3B:
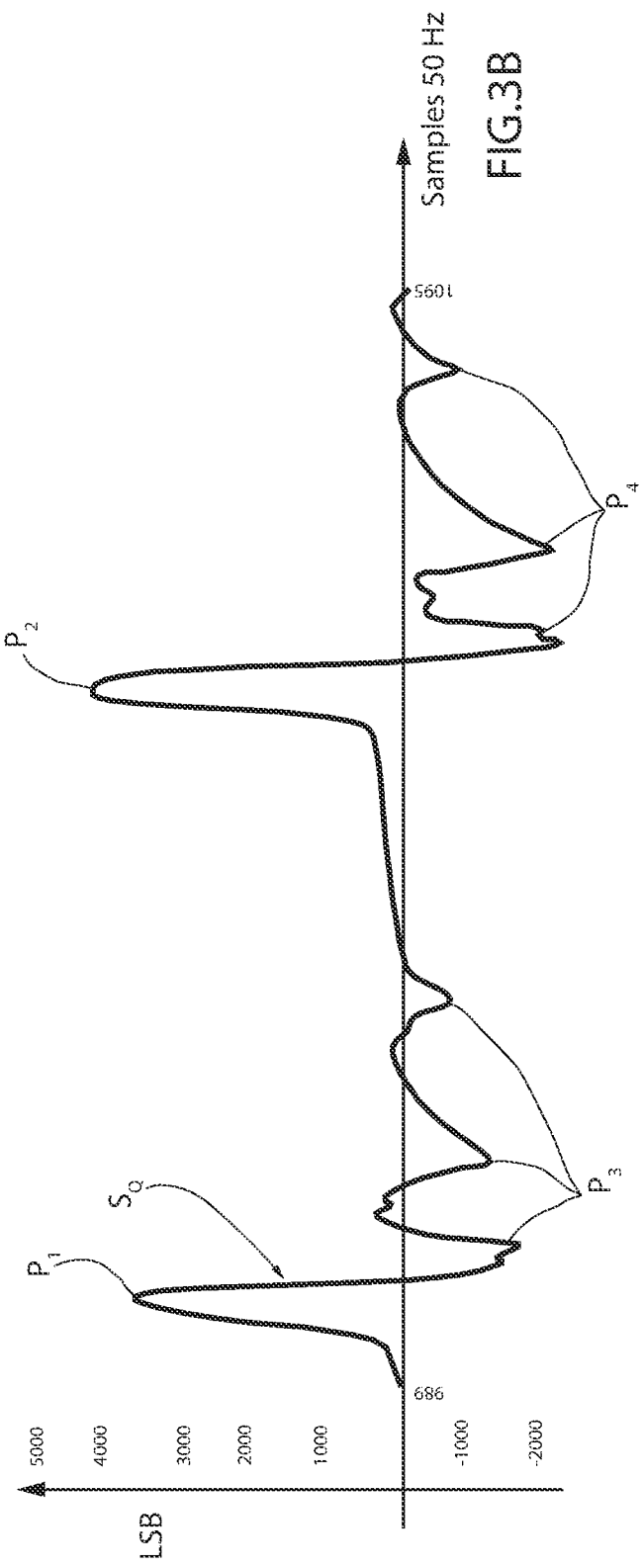

FIG. 3A illustrates an example of the charge-variation signal $S_Q$, for the swimming style known as "front crawl." The signal of FIG. 3B is an enlargement of the signal of FIG. 3A in the portion 25, surrounded by a dashed line, in FIG. 3A. The values of the potential difference Vd, induced by the variation of charge, between the inputs 8a, 8b are represented on the axis of the ordinates of the charge-variation signal $S_Q$. This value is here expressed as LSB (Least Significant Bit), i.e., the minimum digital value at output from the analog-to-digital converter, which is proportional to the potential difference Vd present on the inputs 8a, 8b. Typically, 1 LSB corresponds to a value comprised between some microvolts and some tens of microvolts. The constant of proportionality (or sensitivity) depends upon the gain of the amplifier, upon the resolution of the analog-to-digital converter, and upon possible digital processing operations (e.g., oversampling, decimation, etc.). The representation expressed in LSB is common in the art and is irrespective of a quantification in physical units, in so far as the purpose is typically that of sensing relative variations, with respect to a stationary or basal state.

The progressive numbers of the sample acquired are represented on the axis of the abscissae of the charge-variation signal $S_Q$. The measurements appearing have been made with a sampling frequency of 50 Hz, therefore each sample is spaced in time from the next one by 20 ms.

As may be noted from FIGS. 3A and 3B, for simplicity of representation and greater clarity, the signal is represented with a solid line, and not as a succession of samples. The charge-variation signal $S_Q$ has a plurality of peaks, only some of which are identified by the references p1-p4 in FIGS. 3A and 3B, which follow one another in time with an amplitude much greater than the background noise. A positive peak p1 is followed by a plurality of negative peaks p3, followed by a new positive peak p2, followed by a respective plurality of negative peaks p4. The applicant has verified that the portion of signal including a positive peak p1 and the subsequent negative peaks p3 is generated by a stroke of the user during front crawl, and can be considered a "signal unit" that replicates at each stroke; the subsequent portion of signal including the positive peak p2 and the respective negative peaks p4 is in fact generated by a subsequent, further, stroke of the user during front crawl.

Similarly to FIGS. 3A, 3B, FIGS. 4A and 4B illustrate an example of the charge-variation signal $S_Q$ for the swimming style known as "backstroke" and, for simplicity of representation and greater clarity, the signal is represented with a solid line and not as a succession of samples. The signal of FIG. 4B is an enlargement of the signal of FIG. 4A in the portion 27, surrounded by a dashed line, in FIG. 4A. Also in this case, it is possible to distinguish peculiar signal characteristics, deriving from the specific movement of the arms during backstroke, detected as variation of electrostatic charge by the movement-sensing device 1 of FIG. 2. A series of positive and negative signal peaks are, for example, distinguished, amongst which: a negative peak p5 immediately followed by a positive peak p6, and then a series of negative and positive peaks identified as a whole by p7, which follow the positive peak p6.

The signal that comprises the peaks p5, p6 and p7 regards a stroke of the user who is wearing the movement-sensing device 1 during swimming, and can be considered a "signal unit," which replicates at each stroke. As may be noted from FIGS. 4A and 4B, this signal unit is in fact replicated several times in the signal $S_Q$ represented here.

In a way similar to FIGS. 3A, 3B and FIGS. 4A, 4B, FIGS. 5A and 5B illustrate an example of the charge-variation signal $S_Q$ for the swimming style known as "breaststroke", and for simplicity of representation and greater clarity the signal is represented with a solid line, and not as a succession of samples. The signal of FIG. 5B is an enlargement of the signal of FIG. 5A in the portion 29, surrounded by a dashed line, in FIG. 5A. Also in this case, it is possible to distinguish peculiar signal characteristics, deriving from the specific movement of the arms during breaststroke, detected as variation of electrostatic charge by the movement-sensing device 1 of FIG. 2. In fact, it is possible to distinguish a series of positive and negative signal peaks in rapid succession to one another and replicated in time in so far as each stroke is replicated, from a physical standpoint, in a way similar to a previous stroke and consequently generates an electrostatic-charge-variation signal that is accordingly similar.

Figure 6:
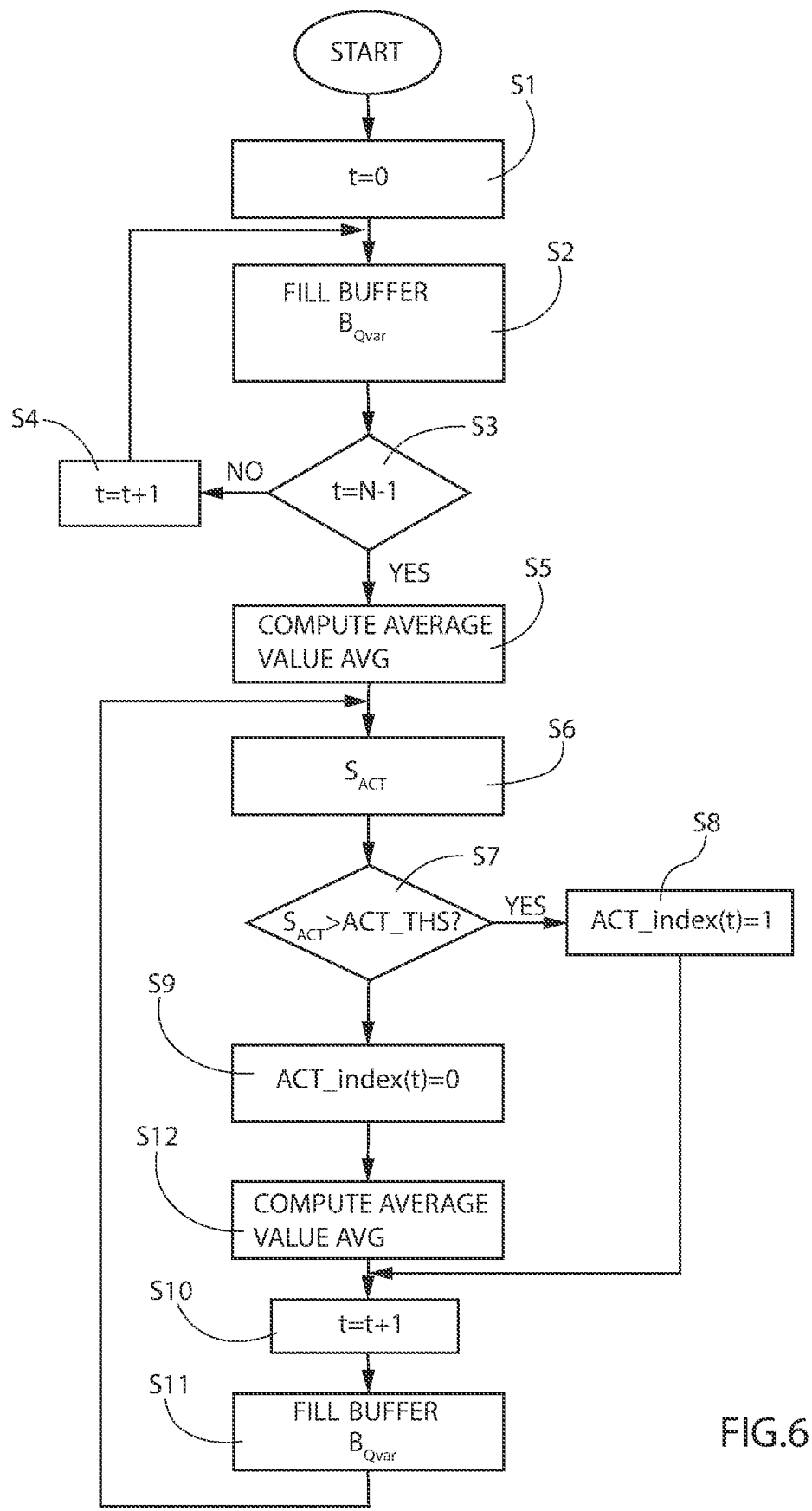
FIG. 6 illustrates, by means of a block diagram, a method implemented by the system of FIG. 1.

FIG. 6 illustrates, by means of a flowchart, a method for detecting the presence of physical activity (in particular, here, swimming) carried out by the user of the device 1. The detection is in real time, and is updated at each instant considered.

With reference to FIG. 6, blocks S1-S5 are implemented for computing an average value AVG of a plurality of samples of the signal $S_Q$. For this purpose, in one embodiment, a buffer $B_{Qvar}$ is used, configured to contain a plurality N of samples of the signal $S_Q$, with N chosen, for example, greater than 30, e.g., N=50. The buffer $B_{Qvar}$ is filled with a sample at each instant "t", between an initial instant, here by way of example t=0, and a final instant, here t=N−1. The buffer $B_{Qvar}$ implements a queue of the FIFO (First In First Out) type such that for each new sample at input to the buffer the oldest sample is eliminated.

Filling of the buffer $B_{Qvar}$ is represented by means of the blocks S1-S4, whereas block S5 represents computation of the average value AVG of the values stored in the buffer $B_{Qvar}$, obtained as sum of the N values of the samples of the signal $S_Q$ divided by N.

Blocks S6-S12 of FIG. 6 identify the operations carried out for detecting the actual presence of physical activity (parameter ACT_index(t)). In this context, the presence of physical activity corresponds to execution of a basic movement of the swimming style considered (e.g., detecting of a stroke via the sensor of FIG. 2), and the absence of physical activity corresponds to the interval elapsing between a basic movement and the basic movement that immediately follows it in time (time interval elapsing between detecting of one stroke and the next).

With reference to block S6, an activity signal $S_{ACT}$ is generated according to the formula $S_{ACT}$=abs ((std($B_{Qvar}$))/AVG), where "abs( )" identifies the operation of computation of the absolute value, and "std( )" identifies the operation of computation of the standard deviation.

With reference to block S7, the activity signal $S_{ACT}$ is compared with a fixed threshold ACT_THS.

If the activity signal $S_{ACT}$ exceeds the threshold ACT_THS, then, in block S8, to the parameter ACT_index (t), regarding the instant t considered, a value is assigned identifying the condition of presence of activity (e.g., ACT_index(t)="1"); otherwise, in block S9, to the parameter ACT_index(t) a value is assigned identifying the condition of absence of activity (e.g., ACT_index(t)="0"). ACT_index(t) therefore implements a buffer (for example, provided as vector) that stores the values "1" and "0" indicating the presence of physical activity, for each instant t considered (with t=0-N) so as to be used in the context of the operations of FIG. 8.

Figures 7A, 7B:
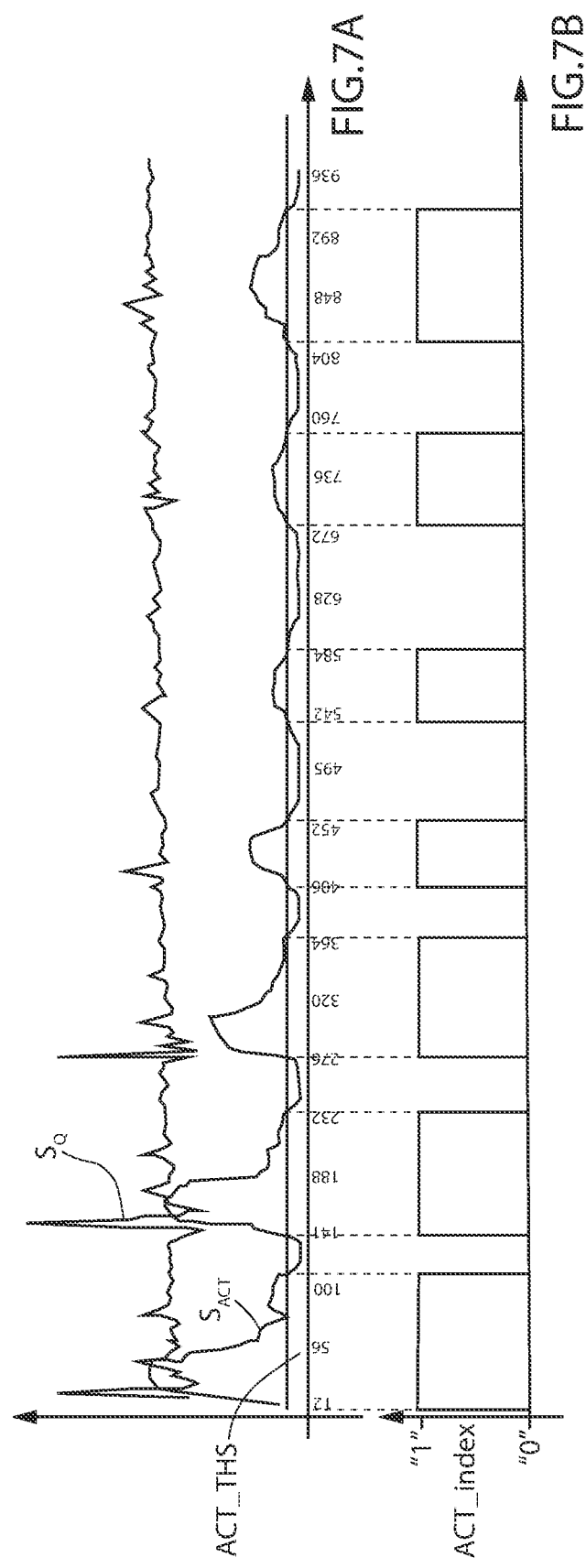
FIGS. 7A and 7B illustrate signals used for implementing the method of FIG. 6.

FIG. 7A represents, superimposed on one another, the signal $S_Q$, the signal $S_{ACT}$ and the threshold ACT_THS; FIG. 7B shows the plot of the values ACT_index(t) as a function of overstepping of the threshold by the signal $S_{ACT}$ in FIG. 7A.

To return to FIG. 6, when execution of physical activity is detected, and therefore ACT_index="1", control goes to block S10, where the time variable "t" is increased by one unit, and a new sample of the signal $S_Q$ (i.e., $S_Q(t)$) is entered into the buffer $B_{Qvar}$ (block S11). The buffer $B_{Qvar}$ is a queue of a FIFO type where, for each new sample at input to the buffer $B_{Qvar}$, the oldest sample is eliminated from the buffer $B_{Qvar}$. Control then returns to block S6 to generate a new activity signal $S_{ACT}$ using the buffer $B_{Qvar}$ that has just been updated.

In the case where block S7 does not detect physical activity, and therefore ACT_index="0" in block S9, control passes to block S12, which implements the same function as that of block S5, i.e., computation of the average value AVG of the values stored in the buffer $B_{Qvar}$, obtained as sum of the N values of the samples of the signal $S_Q$ divided by N. From block S12 control then passes to block S10 described previously. From what has been described it is therefore clear that the average value AVG is computed at each instant t of acquisition of a new sample only when movement is not detected; otherwise, during movement the average value AVG is kept fixed for the purpose of computation of the activity signal $S_{ACT}$ in block S6.

Figure 8:
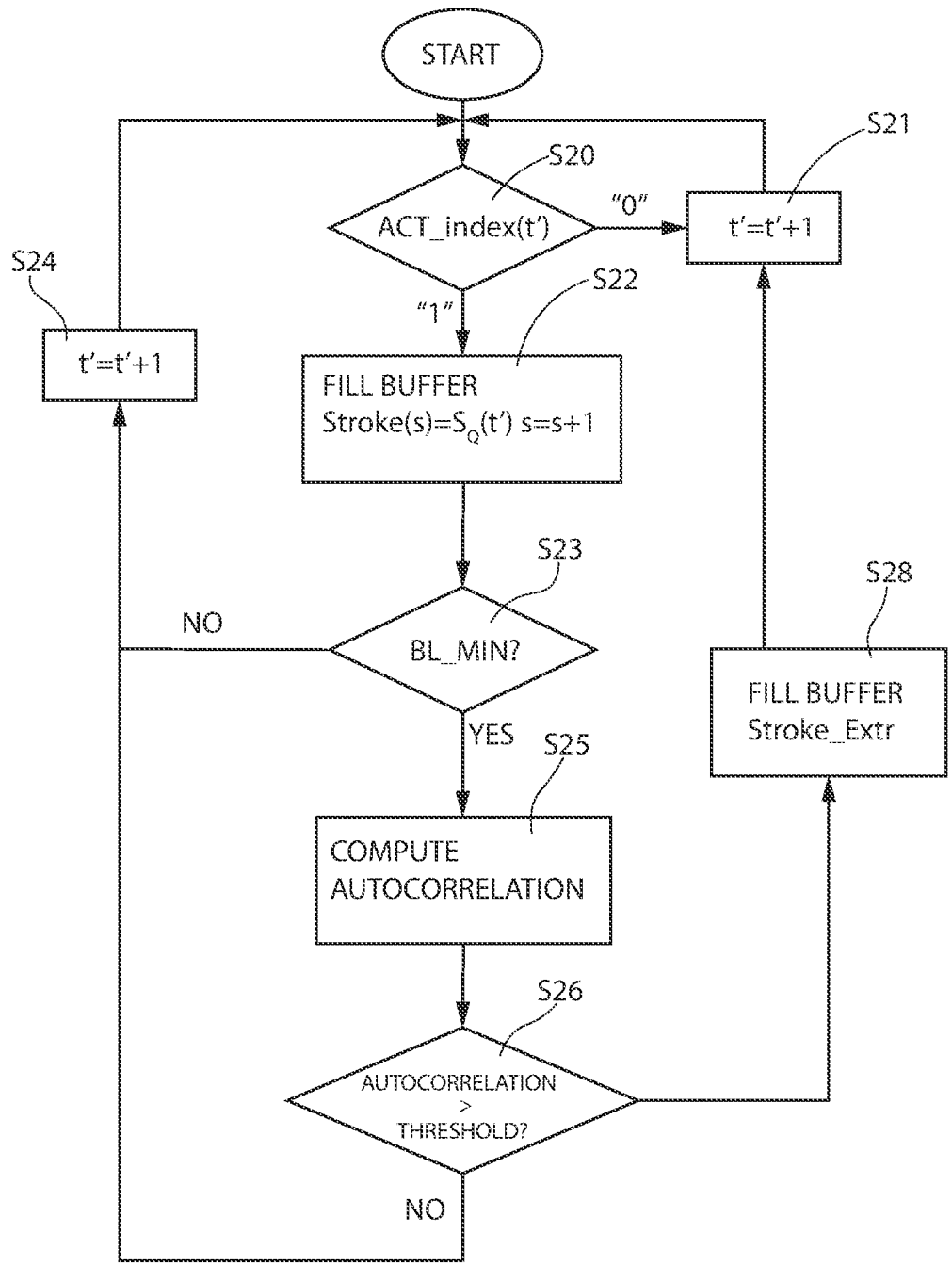
FIG. 8 illustrates, by means of a block diagram, a further method implemented by the system of FIG. 1.

FIG. 8 illustrates, by means of a block diagram, a method for analysis of the charge-variation signal $S_Q$, in order to detect significant components of the signal, i.e., portions of signal that uniquely identify performance of an activity (swimming) and the type of activity (swimming style). The result of the operations of the method of FIG. 8 is functional to subsequent operations aimed at recognition of the type of swimming style performed (front crawl, breaststroke, backstroke, etc.).

The method of FIG. 8 is performed parallel to the method of FIG. 6. It may be noted that the time variable t' used in FIG. 8 is independent of the time variable t of FIG. 6.

With reference to FIG. 8, in block S20 a check is made on the value of the parameter ACT_index(t') at the instant t=0 (therefore, ACT_index is indexed with the variable t'=0). This operation therefore envisages acquisition of the value ACT_index(t'=0) that identifies the presence of activity in progress at the initial instant of processing. In the case where ACT_index(t')="o" (i.e., no physical activity is in progress), control passes to block S21, where the time variable t' is increased by one unit, in order to process the next sample ACT_index(t'+1) and carry out a check on the value of ACT_index(t'+1) in order to detect (block S20) whether physical activity is in progress.

In the case where in block S20 the presence of physical activity were to be detected (current parameter ACT_index equal to "1"), then control passes to block S22, where an intermediate buffer Stroke(s) is used, where "s" indexes each field of the intermediate buffer Stroke(s), for storing samples of the signal $S_Q$ (t=t'). The operation of filling the intermediate buffer Stroke(s) continues until (blocks S23 and S24) a predefined size BL_MIN (e.g., equal to 100 samples) of the buffer Stroke(s) is reached, increasing by one unit the time variable t' and verifying, at each iteration, the presence of physical activity (block S20). These operations have the function of generating the intermediate buffer Stroke(s) containing a number BL_MIN of samples, that follow one another in time, of the signal $S_Q$ exclusively in the presence of physical activity. As illustrated, for example, in FIGS. 4A, 4B, 7A, 7B for the swimming style "backstroke", a sufficient number of consecutive samples of the signal $S_Q$, acquired during identification of the physical activity (ACT_index="1"), uniquely characterizes the type of activity. In fact, in the time interval where ACT_index="1" the signal $S_Q$ shows a peculiar trend, identifying uniquely execution of a stroke. In time intervals different from one another, where in any case the presence of physical activity (ACT_index="1") has been detected, the signal $S_Q$ presents a similar trend in so far as each stroke is replicated, from a physical standpoint, in a way similar to a previous stroke and consequently generates an electrostatic-charge-variation signal that is accordingly similar.

In other words, the intermediate buffer Stroke(s) stores a sub-portion of the signal $S_Q$ that is assumed to be repetitive in time on account of the intrinsic repetitiveness in the swimming style considered. The portion of signal stored in the intermediate buffer Stroke(s) is therefore a repetitive "fundamental unit" of the signal $S_Q$. The repetitiveness is exploited, in block S25, for computing the auto-correlation of the portion of signal stored in the buffer Stroke(s) with the rest of the signal $S_Q$. The functions for computation of the auto-correlation, in particular for a time-discrete signal, are known in the literature and are not described in mathematical detail herein. The applicant has found that use of a sliding window, for example of a size equal to 100 samples of signal $S_Q$, is adequate for computation of the auto-correlation. The operation of block 25 proceeds as long as the result of the computation of the auto-correlation is kept above a predefined threshold (presence of auto-correlation).

The method of FIG. 8 envisages that the auto-correlation is computed between a sub-portion of signal identifying the basic movement and the rest of the signal $S_Q$, by sliding a sliding window along the signal $S_Q$. As long as the auto-correlation function provides a result indicative of the presence of correlation (for example, a predefined threshold is used with which to compare the result of the auto-correlation function), the portions of the signal $S_Q$ delimited by the window, during temporal sliding thereof along the signal $S_Q$, are acquired and stored in a buffer Stroke_Extr (blocks S26 and S28). In this way, the buffer Stroke_Extr contains a portion of the signal $S_Q$ where the presence of the basic movement has been verified.

The steps described above are then repeated for detecting, in the signal $S_Q$, a new portion thereof indicative of the presence of physical activity (ACT_index="1"). This new portion of signal, of a size equal to the sliding window, is stored in the buffer Stroke(s), replacing the data present in the buffer Stroke(s), for being used as new "basic movement" for the subsequent operations of computation of the auto-correlation function.

The foregoing is graphically illustrated in FIGS. 9A-9E.

FIG. 9A illustrates the portion of the signal $S_Q$ stored in the buffer Stroke(s), here referred as "basic portion" or "basic movement."

Illustrated in FIG. 9B is a window 50 applied to the signal $S_Q$, which delimits a respective portion of the signal $S_Q$ used for computation of the auto-correlation with the portion of signal stored in the buffer Stroke(s).

In the case where the computation of the auto-correlation function between the basic portion and the portion delimited by the window 50 yields a result higher than the reference threshold, then, as illustrated in FIG. 9C, the window 50 is shifted forwards by an instant (t=t+1), and the computation of the auto-correlation function is repeated between the basic portion and the new portion of signal delimited by the window 50. This method proceeds iteratively as long as the auto-correlation function yields a result higher than the reference threshold. The buffer Stroke_Extr is filled with the samples of the signal $S_Q$ delimited by the window during sliding of the window 50.

When the auto-correlation function yields a result lower than the reference threshold, filling of the buffer Stroke_Extr terminates. FIG. 9D is a graphic illustration, provided by way of example, of a possible content of the buffer Stroke_Extr, obtained by iterating the steps of FIGS. 9B and 9C.

Figure 9E:
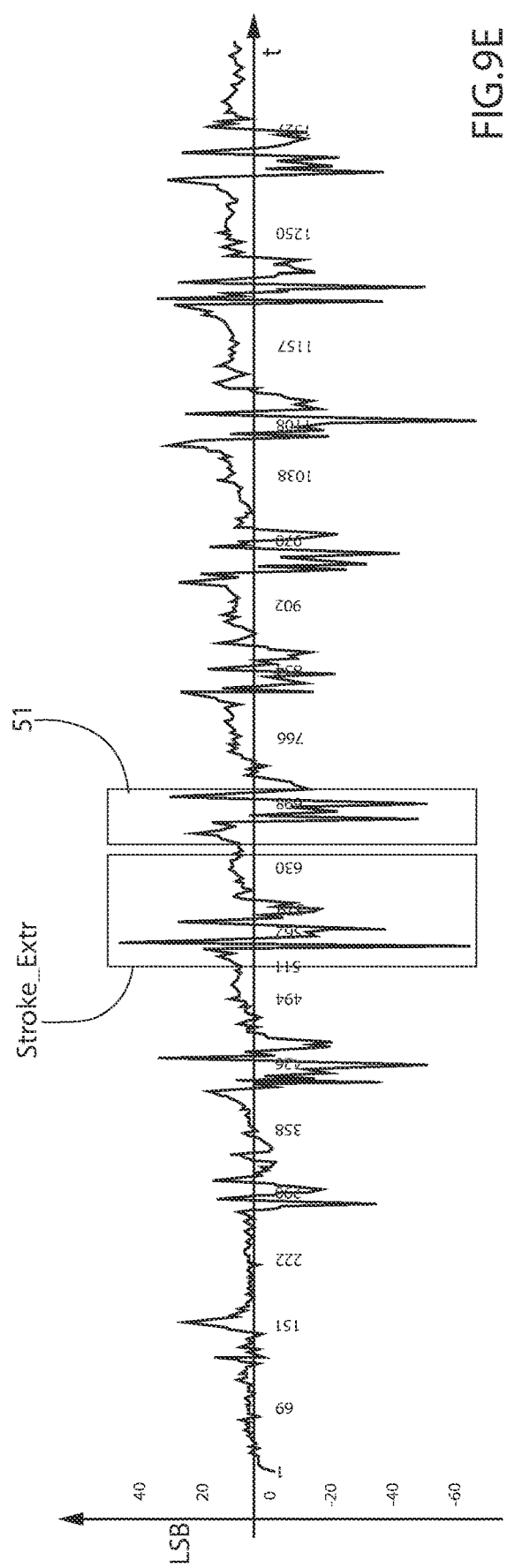

Then, FIG. 9E, the procedure resumes by identifying a new, temporally subsequent, portion of signal $S_Q$ where there is presence of physical activity and the auto-correlation has a value higher than the reference threshold (delimited, in FIG. 9E, by the window 51). According to an aspect of the present invention, this new portion of the signal $S_Q$ is used instead of the one currently present in the intermediate buffer Stroke(s). In this way, it is possible to take into consideration, for the subsequent steps of computation of the auto-correlation, possible variations in the basic movement of the user due, for example, to a modification of the swimming style (for example, on account of fatigue, or for some other reason).

Figure 10:
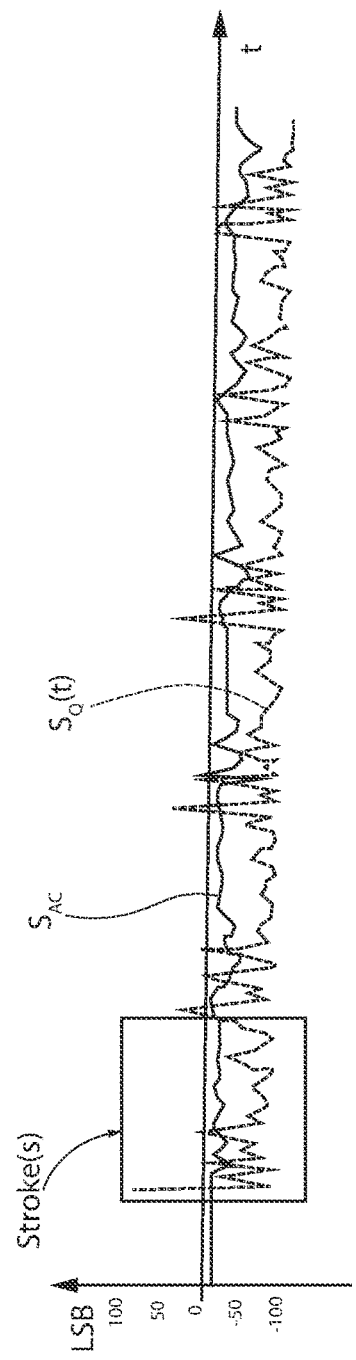
FIG. 10 illustrates signals used for implementing the method of FIG. 8.

FIG. 10 illustrates, superimposed on one another, the signal $S_Q$ and a relative auto-correlation signal $S_{AC}$.

According to a further aspect of the present invention, it is possible to identify the type of swimming style in progress. In particular, this operation can be carried out by comparing a sub-portion of signal $S_Q$ identifying the swimming style (for example, the sub-portion stored in the buffer Stroke(s)) with a plurality of predefined models, regarding respective swimming styles.

The step may be carried out by means of an auto-correlation function, or using techniques of machine learning and/or artificial intelligence for automatic recognition of specific patterns of the signal $S_Q$/Stroke(s) associated with the gesture that is to be detected (e.g., stroke) so as to discriminate between different types of swimming styles.

Likewise, algorithms for automatic recognition of patterns associated with a basic movement made by the user can be used for identifying the physical activity in progress.

According to one aspect of the present invention, each detection of a basic movement may correspond to the increase of a counter, for measuring the number of strokes made by the swimmer during the physical activity.

What is claimed is:

1. A system for detecting execution of a swimming activity of a user, the system comprising:
   an electrostatic-charge-variation sensor configured to sense a variation of electrostatic charge of the user during the execution of the swimming activity and to generate therefrom a charge-variation signal; and
   a microcontroller coupled to the electrostatic-charge-variation sensor and configured to:
      acquire the charge-variation signal from the electrostatic-charge-variation sensor;
      detect a first sub-portion of signal in the charge-variation signal, the first sub-portion of signal identifying a basic movement of the swimming activity;
      store the first sub-portion of signal in a buffer;
      compute an auto-correlation between the first sub-portion of signal stored in the buffer and a second sub-portion of signal of the charge-variation signal, the second sub-portion of signal being temporally subsequent to the first sub-portion of signal;
      detect a presence of the basic movement in the second sub-portion of signal based on a result of the auto-correlation;
      identify a specific swimming style of the basic movement by analyzing the first or second sub-portions of signal, the specific swimming style selected from a group of swimming styles that generate a respective periodic electrostatic-charge-variation signal; and
      increase a counter in response to detecting the basic movement in the second sub-portion of signal.

2. The system according to claim 1, wherein the microcontroller is further configured to analyze the first and second sub-portions of signal in order to identify the specific swimming style.

3. The system according to claim 1, wherein the microcontroller is configured to detect the presence of the basic movement by determining that the computation of the auto-correlation yields a value equal to or greater than a predefined comparison threshold.

4. The system according to claim 1, wherein the microcontroller is configured to select the second sub-portion of signal using a sliding window.

5. The system according to claim 4, wherein the charge-variation signal is time-variable and the sliding window is designed to slide along the charge-variation signal with discrete steps corresponding to successive instants, as long as the result of the auto-correlation confirms the presence of the basic movement.

6. The system according to claim 5, wherein the sliding window has a predefined temporal dimension and delimits a respective intermediate portion of signal at each discrete step, the auto-correlation being computed between the first sub-portion of signal and each intermediate portion of signal delimited by the sliding window at each discrete step, wherein the second sub-portion of signal corresponds to the charge-variation signal comprised in a time interval within which the sliding window is made to slide.

7. The system according to claim 5, wherein the auto-correlation provides a binary value that is generated at each discrete step of sliding of the sliding window and is kept at a constant value as long as a result of a correlation between the first sub-portion of signal and each intermediate portion of signal delimited by the sliding window at each discrete step is greater than a predefined correlation threshold value.

8. The system according to claim 1, wherein the microcontroller is further configured to:
   detect a third sub-portion of signal in the charge-variation signal, the third sub-portion of signal being temporally subsequent to the second sub-portion of signal and identifying the basic movement;
   replace the first sub-portion of signal with the third sub-portion of signal in the buffer;
   compute the auto-correlation between the third sub-portion of signal stored in the buffer and a fourth sub-portion of signal of the charge-variation signal, the fourth sub-portion being temporally subsequent to the third sub-portion of signal; and
   detect the presence of the basic movement in the fourth sub-portion of signal based on a result of the computation of the auto-correlation between the third sub-portion of signal and the fourth sub-portion of signal.

9. The system according to claim 1, wherein the microcontroller is configured to detect the first sub-portion of signal by:
   discretizing the charge-variation signal to generate a first plurality of discrete values;

storing a second plurality of the discrete values in the buffer, the second plurality smaller than the first plurality;

computing an average value of the second plurality of discrete values;

computing a standard deviation of the second plurality of discrete values;

computing an absolute value of a ratio between the standard deviation and the average value of the second plurality of discrete values; and confirming a presence of the swimming activity when the absolute value is equal to or greater than a predefined threshold.

10. The system according to claim 9, wherein the presence of the swimming activity is confirmed when the first sub-portion of signal comprises at least one subset of the second plurality of discrete values.

11. The system according to claim 9, wherein the microcontroller is further configured to detect the first sub-portion of signal by:

determining that the absolute value is greater than the predefined threshold;

storing the second plurality of discrete values in a second buffer;

acquiring a new discrete value of the charge-variation signal;

updating the buffer by storing the new discrete value and eliminating a temporally oldest discrete value from the buffer;

computing an average value of the discrete values stored in the buffer after the updating;

computing a standard deviation of the discrete values stored in the buffer after the updating; and storing the new discrete value in the second buffer when the absolute value computed using the updated buffer is greater than the predefined threshold.

12. The system of claim 11, wherein the microcontroller is further configured to detect the first sub-portion of signal by:

repeating the acquiring the new discrete value, the updating the buffer, the computing the average value and the standard deviation of the discrete values stored in the buffer after the updating, and the storing the new discrete value in the second buffer as long as the absolute value computed using the updated buffer is greater than the predefined threshold; and using a subset of discrete values stored in the second buffer as the first sub-portion of signal.

13. The system according to claim 1, wherein the group of swimming styles consists of front crawl, breaststroke, and backstroke.

14. A method for detecting execution of a swimming activity of a user, the method comprising:

generating, by an electrostatic-charge-variation sensor, an electrostatic-charge-variation signal during the execution of the swimming activity;

acquiring, by a microcontroller, the electrostatic-charge-variation signal from the electrostatic-charge-variation sensor;

detecting, by the microcontroller, a first sub-portion of signal in the charge-variation signal, the first sub-portion of signal identifying a basic movement of the swimming activity;

storing, by the microcontroller, the first sub-portion of signal in a buffer;

computing, by the microcontroller, an auto-correlation between the first sub-portion of signal stored in the buffer and a second sub-portion of signal of the charge-variation signal, the second sub-portion of signal being temporally subsequent to the first sub-portion of signal;

detecting, by the microcontroller, a presence of the basic movement in the second sub-portion of signal based on a result of the auto-correlation;

identifying, by the microcontroller, a specific swimming style of the basic movement by analyzing the first or second sub-portions of signal, the specific swimming style selected from a group of swimming styles that generate a respective periodic electrostatic-charge-variation signal; and incrementing, by the microcontroller, a counter in response to detecting the basic movement in the second sub-portion of signal.

15. The method according to claim 14, further comprising analyzing the first and second sub-portions of signal in order to identify the specific swimming style.

16. The method according to claim 14, wherein detecting the presence of the basic movement comprises determining that the computing of the auto-correlation yields a value equal to or greater than a predefined comparison threshold.

17. The method according to claim 14, further comprising selecting the second sub-portion of signal using a sliding window.

18. The method according to claim 17, wherein the charge-variation signal is time-variable, and the sliding window is designed to slide along the charge-variation signal with discrete steps corresponding to successive instants as long as the result of the auto-correlation confirms the presence of the basic movement.

19. The method according to claim 18, wherein the sliding window has a predefined temporal dimension and delimits a respective intermediate portion of signal at each discrete step, the auto-correlation being computed between the first sub-portion of signal and each intermediate portion of signal delimited by the sliding window at each discrete step, wherein the second sub-portion of signal corresponds to the charge-variation signal comprised in a time interval within which the sliding window is made to slide.

20. The method according to claim 18, wherein the auto-correlation provides a binary value that is generated at each discrete step of sliding of the sliding window and is kept at a constant value as long as a result of a correlation between the first sub-portion of signal and each intermediate portion of signal delimited by the sliding window at each discrete step is greater than a predefined correlation threshold value.

21. The method according to claim 14, further comprising:

detecting a third sub-portion of signal in the charge-variation signal, the third sub-portion of signal being temporally subsequent to the second sub-portion of signal and identifying the basic movement;

replacing the first sub-portion of signal with the third sub-portion of signal in the buffer;

computing the auto-correlation between the third sub-portion of signal stored in the buffer and a fourth sub-portion of signal of the charge-variation signal, the fourth sub-portion of signal being temporally subsequent to the third sub-portion of signal; and detecting the presence of the basic movement in the fourth sub-portion of signal based on a result of the computation of the auto-correlation between the third sub-portion of signal and the fourth sub-portion of signal.

22. The method according to claim 14, wherein the group of swimming styles consists of front crawl, breaststroke, and backstroke.

23. A method for detecting execution of a swimming activity of a user, the method comprising:
- generating, by an electrostatic-charge-variation sensor, an electrostatic-charge-variation signal during the execution of the swimming activity;
- acquiring, by a microcontroller, the electrostatic-charge-variation signal from the electrostatic-charge-variation sensor; discretizing, by the microcontroller, the charge-variation signal to generate a first plurality of discrete values;
- storing, by the microcontroller, a second plurality of the discrete values in a buffer, the second plurality smaller than the first plurality;
- computing, by the microcontroller, an average value of the second plurality of discrete values;
- computing, by the microcontroller, a standard deviation of the second plurality of discrete values;
- computing, by the microcontroller, an absolute value of a ratio between the standard deviation and the average value of the second plurality of discrete values;
- determining, by the microcontroller, a presence of the swimming activity when the absolute value is equal to or greater than a predefined threshold;
- detecting, by the microcontroller, a presence of a basic movement of the swimming activity based on a computed auto-correlation between a first sub-portion of signal of the charge-variation signal and a second sub-portion of signal of the charge-variation signal, the second sub-portion of signal being temporally subsequent to the first sub-portion of signal;
- identifying, by the microcontroller, a specific swimming style of the basic movement by analyzing the first or second sub-portions of signal, the specific swimming style selected from a group of swimming styles that generate a respective periodic electrostatic-charge-variation signal; and
- incrementing, by the microcontroller, a counter in response to detecting the basic movement of the swimming activity.

24. The method according to claim 23, further comprising:
- determining that the absolute value is greater than the predefined threshold;
- storing the second plurality of discrete values in a second buffer;
- acquiring a new discrete value of the charge-variation signal;
- updating the buffer by storing the new discrete value and eliminating a temporally oldest discrete value from the buffer;
- computing an average value of the discrete values stored in the buffer after the updating;
- computing a standard deviation of the discrete values stored in the buffer after the updating; and
- storing the new discrete value in the second buffer if the absolute value computed using the updated buffer is greater than the predefined threshold.

25. The method according to claim 24, further comprising repeating the acquiring the new discrete value, the updating the buffer, the computing the average value and the standard deviation of the discrete values stored in the buffer after the updating, and the storing the new discrete value in the second buffer as long as the absolute value computed using the updated buffer is greater than the predefined threshold.

26. The method according to claim 24, further comprising:
- repeating the acquiring the new discrete value, the updating the buffer, the computing the average value and the standard deviation of the discrete values stored in the buffer after the updating, and the storing the new discrete value in the second buffer as long as the absolute value computed using the updated buffer is greater than the predefined threshold;
- storing a subset of the discrete values stored in the second buffer in the buffer, the subset of the discrete values serving as the first sub-portion of signal;
- computing the auto-correlation between the first sub-portion of signal stored in the second buffer and the second sub-portion of signal of the charge-variation signal; and
- detecting the presence of the basic movement of the swimming activity in the second sub-portion of signal based on a result of the auto-correlation.

27. The method according to claim 23, further comprising analyzing the first and second sub-portions of signal in order to identify the specific swimming style.

28. The method according to claim 23, wherein the group of swimming styles consists of front crawl, breaststroke, and backstroke.

* * * * *